Patented June 10, 1952

2,599,984

UNITED STATES PATENT OFFICE 2,599,984

LUBRICANT CONSISTING OF COPOLYMERIC SILOXANES SUBSTITUTED WITH METHYL, PHENYL, AND HALOGENATED-ARYL RADICALS

Herbert J. Fletcher and Melvin J. Hunter, Midland, Mich., assignors to Dow Corning Corporation, Midland, Mich., a corporation of Michigan No Drawing. Application September 14, 1949, Serial No. 115,783. In Great Britain February 7, 1949

3 Claims. (Cl. 252—49.6)

This invention relates to the method of lubricating moving metallic parts.

This case is a continuation in part of the applicants' copending application Serial Number 77,992, filed February 23, 1949, now abandoned, and assigned to the same assignee as the present invention.

The lubrication of bearing surfaces operating under load at high and low temperatures has heretofore presented very difficult or insoluble problems. Certain petroleum lubricants work satisfactorily under load but fail at low temperatures due to thickening of the lubricant and at elevated temperatures due to its oxidation. Polysiloxane fluids heretofore employed, whereas they are stable at high and low temperatures, are relatively poor lubricants especially under load.

It is an object of this invention to provide a method of lubricating metallic bearing surfaces so that the bearings will operate under loads in excess of 700 p. s. i. at temperatures ranging from below —50° C. to above 150° C.

In accordance with this invention the bearing surfaces of moving metallic parts are lubricated by maintaining therebetween a film comprising a liquid organopolysiloxane which is composed of siloxane units of the type $RSiO_{3/2}$, $R_2SiO$ and $R_3SiO_{1/2}$, so proportioned that the degree of substitution is greater than two and less than three organic radicals per silicon atom. It is to be understood that the term organic radicals as employed herein includes the halogenated aryl as well as methyl and phenyl radicals. In the polysiloxane some of the R groups are halogenated phenyl radicals or halogenated xenyl radicals in amount such that the ratio of halogen atoms to silicon atoms is from 0.05 to 3, said halogen atoms being chlorine and bromine. The remaining R groups in the siloxane are methyl and phenyl and in all cases at least 37 percent of the total number of organic radicals in the polysiloxane are methyl radicals.

In the siloxanes of this invention all of the halogen atoms are contained in silicon bonded halogenated aryl radicals. These radicals contain from 1 to 7 halogen atoms and are of the type $C_6H_nX_{(5-n)}$— and $C_{12}H_yX_{(9-y)}$—, where $n$ has a value from 0 to 4 inclusive, $y$ has a value from 3 to 8 inclusive and X is bromine or chlorine. The latter radicals are halogenated xenyl radicals which term is employed herein to designate the radical $C_6H_5C_6H_4$— which is also known as a diphenyl radical. For the purpose of this invention the above identified halogenated radicals may be substituted on a silicon atom in a $RSiO_{3/2}$, $R_2SiO$ or a $R_3SiO_{1/2}$ siloxane unit or on the silicon atoms of any combination of these units.

The proportion of halogenated aryl radicals in the liquid copolymeric siloxanes is such that the ratio of halogen atoms to silicon atoms is between 0.05 and 3. The remainder of the radicals in the polysiloxane are methyl or phenyl. However, in all cases the number of methyl radicals is at least 37 percent of the total number of organic radicals in the polysiloxane. When the halogenated aryl and methyl radicals are within the above limits the siloxanes will function satisfactorily as high pressure lubricants at both high and low temperatures.

Halogenated polysiloxanes may be prepared by several methods. Generally speaking it is preferable to first prepare a silane of the type $(XR)_nSiCl_{4-n}$ and then hydrolyze this material to the siloxane. Alternatively a phenyl or zenyl siloxane may be halogenated directly by contacting it with chlorine or bromine.

The halogenated aryl chlorosilanes employed in this invention may be prepared either by direct halogenation of the corresponding aryl chlorosilanes or by reacting a halogenated aryl hydrocarbon with trichlorosilane. The former method is preferable when more than two halogen atoms are to be substituted on the aryl radical. Direct halogenation is carried out by contacting the chlorosilane with chlorine or bromine in the presence of FeCl₃ as a catalyst. The catalyst is preferably employed in amount of 0.1% by weight based on the weight of the silane. This method results in preferential halogenation of aryl radicals and may be employed with either silanes or siloxanes.

The copolymers employed in this invention may be prepared by cohydrolyzing halogenated aryl chlorosilanes with methyl and phenyl chlorosilanes. Alternatively the instant copolymers can be prepared by catalytic copolymerization of halogenated aryl siloxanes with methyl and phenyl siloxanes. Catalyst for siloxane copolymerization, as is well known in the art, include acids, alkali metal hydroxides, alkali metal alkoxides and heavy metal salts such as FeCl₃ and lead salts of carboxylic acids. None of these catalysts cause removal of halogen atoms from the halogenated aryl siloxanes.

The liquid polysiloxanes herein described may be employed as such to lubricate moving metallic parts or the liquid polysiloxane may be compounded with a thickening agent to produce a grease and the grease so prepared may be employed as the lubricant. Improved lubrication of the bearing surfaces of moving metallic parts is obtained both when the lubricant is in the form of a liquid and when it is in the form of a grease.

Such greases may be prepared by compounding the liquid siloxanes in any appropriate manner with any suitable thickening agent. Preferred thickening agents are alkali metal salts and alkaline earth metal salts of higher fatty acids such as lithium stearate and alkali metal salts and alkaline earth metal salts of alicyclic substituted fatty acids wherein the fatty acid has a chain length of from 1 to 6 carbon atoms. The relative proportion of the siloxane and the thickening agent is such that there is at least 50 percent of the liquid polysiloxane present.

The alicyclic substituted fatty acids having a chain length of from 1 to 6 carbon atoms which may be employed include for example, cyclohexylacetic, cyclohexylpropionic, cyclohexylbutyric, cyclohexylvaleric, cyclohexylcaproic, alpha butylcyclohexylacetic, gamma ethylcyclohexylbutyric, alpha 4-diterbutylcyclohexylbutyric, alpha 4-disecbutylcyclohexylbutyric, 2-cyclohexenecaproic, pentalaneacetic and cyclophenylvaleric.

The alkali metal salts and alkaline earth metal salts of the higher fatty acids and such salts of the alicyclic substituted fatty acids may be prepared by reacting the acids with the metal hydroxide.

The acid salts and the siloxane fluids may be compounded in any appropriate manner. For example, the salt may be dispersed in the siloxane by dissolving both in a common solvent and then evaporating the latter, or the salt may be introduced directly into the siloxane and dissolved by heating and agitating the mixture, or the salt may be formed in situ by adding an aqueous solution of the metal hydroxide to a solution of the acid in the siloxane.

A preferred method of preparing the greases is to add an aqueous solution of the metal hydroxide to a solution of the acid in an equal weight of the siloxane. The addition is preferably carried out at a temperature of about 80° C. The water is evaporated by heating at 100° C. and more siloxane is added to the residue. The product is then heated at a temperature up to 200° C., cooled and milled.

In the preparation of the grease, the amount of alkali added may be more or less than enough to neutralize the acid or it may be in amount equivalent to the acid. Thus, the grease may be either acidic, neutral or alkaline in character. It is preferred, however, that the grease be alkaline with an alkaline number of at least 5. The alkaline number is determined by titrating a one-gram sample of the material with standard acid and calculating the milligrams of KOH which are equivalent to the acid necessary to neutralize the sample. The number is always expressed in milligrams of potassium hydroxide regardless of the type of alkali present in the grease.

The lubricants used in this invention consist essentially of the ingredients shown above. However, they may contain small amounts of other additives such as corrosion inhibitors and other materials which are normally included in lubricants. These minor additives, however, do not effect the main characteristics of the lubricants nor is the effectiveness of the present materials as lubricants dependent thereon. It is to be understood that minor additives such as corrosion inhibitors or inert materials may be present in the siloxane fluids as such and in greases prepared from the siloxane fluids.

The halogenated siloxanes employed in this invention are superior to organic oils as lubricants for bearings operating at extremes of temperature. This superior lubricity is apparent both at high and low temperatures. For example, moving metallic parts lubricated by the siloxanes may be operated at temperatures in excess of 150° C. and at temperatures below −50° C. The improved results are obtained both when the liquid siloxane is used as such and when it is compounded with a thickening agent and then employed.

The superiority of the liquid polysiloxanes containing halogenated phenyl substituents was determined by means of a Falex Lubricant Testing Machine. This machine is recognized in the art as giving a true measure of the efficiency of a lubricant in preventing wear of the bearing surfaces of moving metallic parts. A description of the machine and its operation is given in an article by Victor A. Ryan in Lubrication Engineering, September 1946, pages 102 to 104.

Essentially the test involves rotating a shaft between two V-blocks as pressure is applied to the bearing surfaces. The resulting wear of the shaft and the V-blocks when operated under a given load and for a given period of time is measured by means of a ratchet-wheel. The wear is expressed in teeth wear, one tooth wear being equal to .0000556 inch of wear in depth.

The results of tests with several of the liquid polysiloxanes employing a steel shaft and steel V-blocks are shown in Table I. These tests were run at room temperature. For the sake of comparison the results of tests using polysiloxanes which contain no halogenated phenyl radicals are included. In the table the gage load is the load in pounds applied to the bearing surfaces.

Table II shows the results of two tests employing steel V-blocks and a brass shaft.

The lubricity of these halogenated siloxanes, as shown by their ability to reduce wear, is increased by including therein any known so called extreme pressure additive.

To better understand this invention, recourse may be had to the following examples which should be considered as illustrative only.

EXAMPLE 1

A copolymeric siloxane fluid was prepared from a mixture of 270 g. of chlorophenylmethyldichlorosilane, 1238 g. of dimethyldichlorosilane and 204.6 g. of phenyldimethylchlorosilane. The silane mixture was dissolved in toluene and the ingredients were cohydrolyzed by adding the solution to a 500 percent excess of water over that necessary for hydrolysis during a period of 2 hours and 25 minutes. During the addition of the halides the temperature of the hydrolysis medium was maintained at between 10° and 15° C. and the mixture was agitated. After the addition of the halides was complete the mixture was agitated and refluxed for two hours. The aqueous acid layer was removed and 1086 g. of toluene was added to the cohydrolyzate. The solution was washed with water until the washings were neutral. The solution was then filtered and heated to 160° C. under reduced pressure to remove the solvent and finally at 280° C. under pressure of 2 millimeters. The residue was a fluid of 43.7 cs. viscosity.

EXAMPLE 2

A copolymeric siloxane fluid having the composition 10 mol percent chlorophenylmethylsiloxane, 89.5 mol percent dimethylsiloxane and 0.5 mol percent trimethylsiloxane was prepared in the following manner:

A mixture of 51.2 g. of liquid chlorophenylmethylsiloxane, 198.5 g. of mixed cyclic dimethylsiloxanes and 2.3 g. of

was refluxed with 0.335 g. of KOH and 125 g. of benzene until no more water was evolved. The solvent was then removed by distillation and the temperature was raised to 160° C. Heating at this temperature was continued until the fluid reached a viscosity of about 9000 cs. 0.53 g. of trimethylchlorosilane in 125 g. of toluene was added to the copolymerized siloxane in order to neutralize the alkali. The solution was held at a temperature of 160° C. to remove the solvent and then at a temperature of 250° C. under a vacuum of 2 millimeters in order to remove low boiling siloxanes. The residue was a fluid of 9250 cs. viscosity.

EXAMPLE 3

A mixture of 159 g. of heptachloroxenyltrichlorosilane, 658 g. of dimethyldichlorosilane and 65.2 g. of trimethylchlorosilane was dissolved in toluene and the solution was added with agitation to a mixture of 1025 g. of water and 168 g. of toluene. During addition of the chlorides the hydrolysis mixture was maintained at less than 15° C. The mixture was heated 8 hours at 48° C. to 85° C. and then 953 g. of toluene was added. The toluene layer was removed and washed till neutral. The solution was filtered and the solvent was removed by distillation leaving a liquid copolymer having the composition 5 mol percent $C_{12}H_2Cl_7SiO_{3/2}$, 85 mol percent $(CH_3)_2SiO$ and 10 mol percent $(CH_3)_3SiO_{1/2}$.

EXAMPLE 4

The liquid copolymeric siloxanes having the compositions shown in Table I were prepared according to the methods of Examples 1, 2 or 3. These siloxanes were used to lubricate the bearing surfaces of moving metallic parts as shown in Tables I and II.

*Table I*

[Bearing surfaces are steel V-blocks and a steel shaft.]

| Composition of siloxane in mol percent | Initial gage load | Gage load after 30 min. | Temp. rise in °C. | Torque in lb.-ins. | Teeth wear after 30 min. |
|---|---|---|---|---|---|
| $25(CH_3)_3SiO_{1/2}, 75CH_3(C_6H_5)SiO$ | 50 | (¹) | (¹) | (¹) | (¹) |
| $10(CH_3)_3SiO_{1/2}, 80(CH_3)_2SiO, 10CH_3(C_6H_5)SiO$ | 50 | (¹) | (¹) | (¹) | (¹) |
| $10(CH_3)_3SiO_{1/2}, 90(CH_3)_2SiO$ | 50 | (¹) | (¹) | (¹) | (¹) |
| $35C_6H_5(CH_3)_2SiO_{1/2}, 65ClC_6H_4(CH_3)SiO$ | 50 | 50 | 14 | 3.0 | 3 |
| $25(CH_3)_3SiO_{1/2}, 75ClC_6H_4(CH_3)SiO$ | 50 | 50 | 16 | 3.0 | 0 |
| $25(CH_3)_3SiO_{1/2}, 75ClC_6H_4(CH_3)SiO$ | 100 | 100 | 53 | 13.0 | 17 |
| $20C_6H_5(CH_3)_2SiO_{1/2}, 40(CH_3)_2SiO, 40ClC_6H_4(CH_3)SiO$ | 50 | 40 | 11 | 6.5 | 24 |
| $15C_6H_5(CH_3)_2SiO_{1/2}, 75(CH_3)_2SiO, 10ClC_6H_4(CH_3)SiO$ | 50 | 25 | 26 | 4.5 | 120 |
| $10(CH_3)_3SiO_{1/2}, 85(CH_3)_2SiO, 5ClC_6H_4(CH_3)SiO$ | 50 | 0 | 12 | 5.5 | 306 |
| $1(CH_3)_3SiO_{1/2}, 89(CH_3)_2SiO, 10ClC_6H_4(CH_3)SiO$ | 50 | 25 | 9 | 4.5 | 360 |
| $10(C_6H_5)_2CH_3SiO_{1/2}, 80(CH_3)_2SiO, 10ClC_6H_4(CH_3)SiO$ | 50 | 25 | 17 | 5.5 | 330 |
| $0.5(CH_3)_3SiO_{1/2}, 89.5(CH_3)_2SiO, 10ClC_6H_4(CH_3)SiO$ | 50 | 15 | 13 | 4.0 | 183 |
| $10ClC_6H_4(CH_3)_2SiO_{1/2}, 80(CH_3)_2SiO, 1.25ClC_6H_4(CH_3)SiO, 8.75CH_3(C_6H_5)SiO$ | 50 | 30 | 22 | 5.0 | 132 |
| $20(CH_3)_3SiO_{1/2}, 30(CH_3)_2SiO, 40C_6H_5(CH_3)SiO, 10ClC_6H_4(CH_3)SiO$ | 50 | 15 | 21 | 6.0 | 198 |
| $10(CH_3)_3SiO_{1/2}, 80(CH_3)_2SiO, 10BrC_6H_4(CH_3)SiO$ | 50 | 40 | 22 | 4.0 | 77 |
| $10Cl_2C_6H_3(CH_3)SiO, 80(CH_3)_2SiO, 10(CH_3)_3SiO_{1/2}$ | 50 | 40 | 23 | 4.5 | 45 |
| $5(ClC_6H_4)_2SiO, 85(CH_3)_2SiO, 10(CH_3)_3SiO_{1/2}$ | 50 | 25 | 24 | 5.0 | 126 |
| $5ClC_6H_4(C_6H_5)SiO, 85(CH_3)_2SiO, 10(CH_3)_3SiO_{1/2}$ | 50 | 0 | 17 | 6.0 | 275 |
| $5C_{12}H_2Cl_7SiO_{3/2}, 85(CH_3)_2SiO, 10(CH_3)_3SiO_{1/2}$ | 100 | 91 | 29 | 10 | 39 |
| $5Br_3C_6H_2SiO_{3/2}, 85(CH_3)_2SiO, 10(CH_3)_3SiO_{1/2}$ | 100 | 80 | 23 | 8 | 94 |
| $2Br_3C_6H_2SiO_{3/2}, 91(CH_3)_2SiO, 7(CH_3)_3SiO_{1/2}$ | 100 | 60 | 20 | 6 | 189 |
| $5BrC_6H_4SiO_{3/2}, 85(CH_3)_2SiO, 10(CH_3)_3SiO_{1/2}$ | 100 | 20 | 22.5 | 10 | 368 |
| $5Cl_2C_6H_3SiO_{3/2}, 80(CH_3)_2SiO, 5C_6H_5(CH_3)SiO, 10(CH_3)_3SiO_{1/2}$ | 100 | 63 | 27.5 | 8.5 | 181 |

¹ Failed completely in 25 seconds.

*Table II*

[Bearing surfaces are steel V-blocks and brass shafts.]

| Composition of siloxane in mol percent | Initial gage load | Gage load after 30 min. | Temp. rise in °C. | Torque in lb.-ins. | Teeth wear after 30 min. |
|---|---|---|---|---|---|
| $25(CH_3)_3SiO_{1/2}, 75CH_3C_6H_5SiO$ | 100 | 90 | 66 | 15 | 17 |
| $10(CH_3)_3SiO_{1/2}, 65(CH_3)_2SiO, 25ClC_6H_4(CH_3)SiO$ | 100 | 100 | 26 | 5 | 1 |

EXAMPLE 5

10 g. of cyclohexylcaproic acid was dissolved in 10 g. of a 100 cs. copolymeric siloxane having the composition 10 mol percent $(CH_3)_3SiO_{1/2}$ and 90 mol percent $ClC_6H_4(CH_3)SiO$. The solution was heated to 60° C. and agitated as a solution of 2.1 g. of $LiOH.H_2O$ in 15 g. of water was added. The temperature was raised to 100° C. to remove the water. The residue was maintained at a temperature of 120° C. during addition of 20 g. more of the copolymeric siloxane. The resulting mixture was heated at 100° C. for one hour, cooled and milled to produce a grease. The grease performed satisfactorily in the lubrication of metallic bearings.

EXAMPLE 6

When the halogenated phenyl copolymeric siloxanes shown in Table I, Example 4 are compounded with the lithium, sodium, potassium, barium or strontium salts of the higher fatty acids and such salts of the alicyclic substituted fatty acids defined above, according to the method of Example 5 a grease results. These greases perform satisfactorily when employed as a lubricant for the bearing surfaces of moving metallic parts.

That which is claimed is:

1. A composition of matter composed of a liquid copolymeric siloxane having a degree of substitution of greater than 2 and less than 3 organic radicals per silicon atom said siloxane containing halogenated aryl radicals selected from the group consisting of halogenated phenyl and halogenated xenyl radicals said radicals having substituted therein from 1 to 7 inclusive halogen atoms selected from the group consisting of chlorine and bromine, the remaining organic radicals in said siloxane being selected from the group consisting of methyl and phenyl radicals, in which siloxane the halogenated aryl radicals are present in amount so that the ratio of halogen atoms to silicon atoms is from 0.05 to 3 and in which siloxane at least 37 percent of the total number of organic radicals are methyl radicals.

2. A grease composed essentially of a liquid copolymeric siloxane and a minor amount of a thickening agent selected from the group consisting of alkali and alkaline earth metal salts of higher fatty acids and alkali and alkaline earth metal salts of alicyclic-substituted fatty acids, said siloxane having a degree of substitution of greater than 2 and less than 3 organic radicals per silicon atom and said siloxane containing halogenated aryl radicals selected from the group consisting of halogenated phenyl and halogenated xenyl radicals said radicals having substituted therein from 1 to 7 inclusive halogen atoms selected from the group consisting of chlorine and bromine, the remaining organic radicals in said siloxane being selected from the group consisting of methyl and phenyl radicals in which siloxane the halogenated aryl radicals are present in amount so that the ratio of halogen atoms to silicon atoms is from 0.05 to 3 and in which siloxane at least 37 percent of the total number of organic radicals are methyl radicals.

3. A lubricant composed essentially of a liquid copolymeric siloxane having a degree of substitution of greater than 2 and less than 3 organic radicals per silicon atom said siloxane containing halogenated aryl radicals selected from the group consisting of halogenated phenyl and halogenated xenyl radicals said radicals having substituted therein from 1 to 7 inclusive halogen atoms selected from the group consisting of chlorine and bromine, the remaining organic radicals in said siloxane being selected from the group consisting of methyl and phenyl radicals, in which siloxane the halogenated aryl radicals are present in amount so that the ratio of halogen atoms to silicon atoms is from 0.05 to 3 and in which siloxane at least 37 percent of the total number of organic radicals are methyl radicals.

HERBERT J. FLETCHER.
MELVIN J. HUNTER.

REFERENCES CITED

The following references are of record in the file of this patent:

UNITED STATES PATENTS

| Number | Name | Date |
|---|---|---|
| 2,258,222 | Rochow | Oct. 7, 1941 |
| 2,446,177 | Hain | Aug. 3, 1948 |
| 2,457,677 | Hyde | Dec. 28, 1948 |
| 2,483,158 | Sprung et al. | Sept. 27, 1949 |
| 2,486,674 | Pedersen | Nov. 1, 1949 |